United States Patent
Webman et al.

(10) Patent No.: US 9,948,386 B1
(45) Date of Patent: Apr. 17, 2018

(54) METHOD OF CONFIGURING AN OPTOELECTRONIC SYSTEM FOR ACCOMMODATING DIFFERENT FIBER OPTIC CABLE LENGTHS

(71) Applicant: Mellanox Technologies, Ltd., Yokneam (IL)

(72) Inventors: Alon Webman, Tel Aviv (IL); Elad Mentovich, Tel Aviv (IL); Sylvie Rockman, Zichron Yaakov (IL); Vadim Balakhovski, Holon (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/395,260

(22) Filed: Dec. 30, 2016

(51) Int. Cl.
*H04B 17/00* (2015.01)
*H04B 10/079* (2013.01)
*H04B 10/25* (2013.01)

(52) U.S. Cl.
CPC ..... *H04B 10/0791* (2013.01); *H04B 10/2504* (2013.01)

(58) Field of Classification Search
CPC .......... H04B 10/0791; H04B 10/2504

USPC .......................................... 398/20
See application file for complete search history.

(56) References Cited

U.S. PATENT DOCUMENTS

| | | | |
|---|---|---|---|
| 9,692,511 B1 * | 6/2017 | Webman | H04B 10/2504 |
| 2007/0122157 A1 * | 5/2007 | Vandewege | H04B 10/032 398/141 |
| 2007/0237472 A1 * | 10/2007 | Aronson | G02B 6/4292 385/101 |
| 2017/0222717 A1 * | 8/2017 | Rope | H04B 10/0791 |

\* cited by examiner

*Primary Examiner* — Juan A Torres
(74) *Attorney, Agent, or Firm* — Alston & Bird LLP

(57) ABSTRACT

An optoelectronic configuration method is provided. The method includes determining a baseline link budget value for the VCSEL. The method applies a constant input value to a VCSEL and monitors the output of the VCSEL. The method calculates a first link budget value from the inputs and outputs of the VCSEL and compares the first link budget value with the baseline link budget value to determine either a pass state of the VCSEL or a fail state of the VCSEL. If a fail state of the VCSEL is determined, the method may iteratively apply modified inputs to the VCSEL until the desired relationship between the first link budget value and the baseline link budget value is obtained.

20 Claims, 3 Drawing Sheets

METHOD OF CONFIGURING AN OPTOELECTRONIC SYSTEM FOR ACCOMMODATING DIFFERENT FIBER OPTIC CABLE LENGTHS

FIELD OF THE INVENTION

The present disclosure relates generally to vertical-cavity surface-emitting lasers (VCSELs) and, more particularly, to apparatuses and associated methods of adjusting the operation of a VCSEL to accommodate different lengths of optical cable.

BACKGROUND OF THE INVENTION

Optoelectronic communication systems, often utilized in data centers, include cables that transmit signals over optical media. Optoelectronic communication systems may utilize active optical cables (AOC) as optical media and may also include separate circuitry that facilitates the transmissions along the optical cables using one or more transducers. For example, modern optoelectronic communication systems may utilize vertical-cavity surface-emitting lasers (VCSELs) as optoelectronic transducers that convert electrical signals to light for transmission through the AOCs.

AOCs and other optical cables are manufactured to a predetermined, manufacturer defined length. Traditionally, when wiring components together in a data center, multiple cables are necessary for making connections to a single component in a data center rack, resulting in multiple cables occupying a small space. These conventional wiring methods result in tangled and/or complexly wired racks that may operate inefficiently.

The inventors have identified a number of additional deficiencies and problems associated with conventional AOC wiring and associated methods. Through applied effort, ingenuity, and innovation, many of these identified problems have been solved by developing solutions that are included in embodiments of the present invention, many examples of which are described in detail herein.

BRIEF SUMMARY OF THE INVENTION

Accordingly, the methods and computer readable mediums described herein provide improve mechanisms for adjusting the operation of a VCSEL to accommodate different lengths of optical cable. In some embodiments, a method for configuring an optoelectronic system including a vertical cavity surface emitting laser (VCSEL) for emitting light to accommodate an optical cable having a user-configured length is provided. The method may include the steps of determining a first baseline link budget value reflective of operation of a VCSEL with an optical cable having a pre-defined length and applying a first constant value input to the VCSEL, wherein the VCSEL is coupled to an optical cable having a user configured length, wherein the user configured length is different from the pre-defined length. The method may further include monitoring a first output of the VCSEL, calculating a first link budget value based on the first output and the first constant value input of the VCSEL, and determining a first pass state or a first fail state of the VCSEL based on a comparison of the first link budget value to the first baseline link budget value. Thus, if a fail state is determined, the method may include iteratively applying a first modified constant value input to the VCSEL, calculating a first modified link budget value, and comparing the first modified link budget value to the first baseline link budget value to determine a first pass state or a first fail state of the VCSEL.

In some cases, the first constant value input may be a voltage and the first output may be a current.

In other cases, the first constant value input may be a current value and the first output may be a voltage.

In other embodiments, the method may further comprise determining a second baseline link budget value reflective of operation of a VCSEL with an optical cable having a pre-defined length, applying a second constant value input to the VCSEL, and monitoring a second output of the VCSEL. The method may further include calculating a second link budget value based on the second output and the second constant value input of the VCSEL, determining a second pass state or a second fail state of the VCSEL based on a comparison of the second link budget value to the second baseline link budget value, and, if a fail state is determined, iteratively applying a second modified constant value input to the VCSEL, calculating a second modified link budget value, and comparing the second modified link budget value to the second baseline link budget value to determine a second pass state or a second fail state of the VCSEL.

In such an embodiment, the second constant value input may be larger than the first constant value input, and the second constant value input may be indicative of a high bandwidth environment.

In some cases, the second constant value input may be a voltage and the second output may be a current.

In other cases, the second constant value input may be a current and the second output may be a voltage.

In some still other cases, the method may further include the steps of varying a pre-emphasis value input to the VCSEL, wherein varying the pre-emphasis value input modifies the second link budget value.

In some further cases the second modified constant value input may be determined via a pseudorandom binary sequence (PRBS) algorithm.

In some embodiments the optical cable may be a plastic optical fiber (POF).

In other embodiments, a non-transitory computer-readable medium having computer instructions stored thereon is provided. The computer program instructions may be configured to receive a first baseline link budget value reflective of operation of a VCSEL with an optical cable having a pre-defined length and apply a first constant value input to the VCSEL, wherein the VCSEL is coupled to an optical cable having a user configured length, wherein the user configured length is different from the pre-defined length. The computer readable medium may further monitor a first output of the VCSEL, calculate a first link budget value based on the first output and the first constant value input of the VCSEL, and determine a first pass state or a first fail state of the VCSEL based on a comparison of the first link budget value to the first baseline link budget value. If a fail state is determined, the computer-readable medium may further iteratively apply a first modified constant value input to the VCSEL, calculate a first modified link budget value, and compare the first modified link budget value to the first baseline link budget value to determine a first pass state or a first fail state of the VCSEL.

In some cases, the first constant value input may be a voltage and the first output may be a current.

In other cases, the first constant value input may be a current value and the first output may be a voltage.

In other embodiments, the computer-readable medium may further comprise instructions for determining a second baseline link budget value reflective of operation of a VCSEL with an optical cable having a pre-defined length, applying a second constant value input to the VCSEL, and monitoring a second output of the VCSEL. The computer-readable medium may further comprise instructions for calculating a second link budget value based on the second output and the second constant value input of the VCSEL, determining a second pass state or a second fail state of the VCSEL based on a comparison of the second link budget value to the second baseline link budget value, and, if a fail state is determined, iteratively applying a second modified constant value input to the VCSEL, calculating a second modified link budget value, and comparing the second modified link budget value to the second baseline link budget value to determine a second pass state or a second fail state of the VCSEL.

In such an embodiment, the second constant value input may be larger than the first constant value input and the second constant value input may be indicative of a high bandwidth environment.

In some cases, the second constant value input may be a voltage and the second output may be a current.

In other cases, the second constant value input may be a current and the second output may be a voltage.

In some still other cases, the computer-readable medium may further comprise instructions for varying a pre-emphasis value input to the VCSEL, wherein varying the pre-emphasis value input modifies the second link budget value.

In some further cases the second modified constant value input may be determined via a pseudorandom binary sequence (PRBS) algorithm.

In some embodiments the optical cable may be a plastic optical fiber (POF).

BRIEF DESCRIPTION OF THE SEVERAL VIEWS OF THE DRAWINGS

Figure 1:
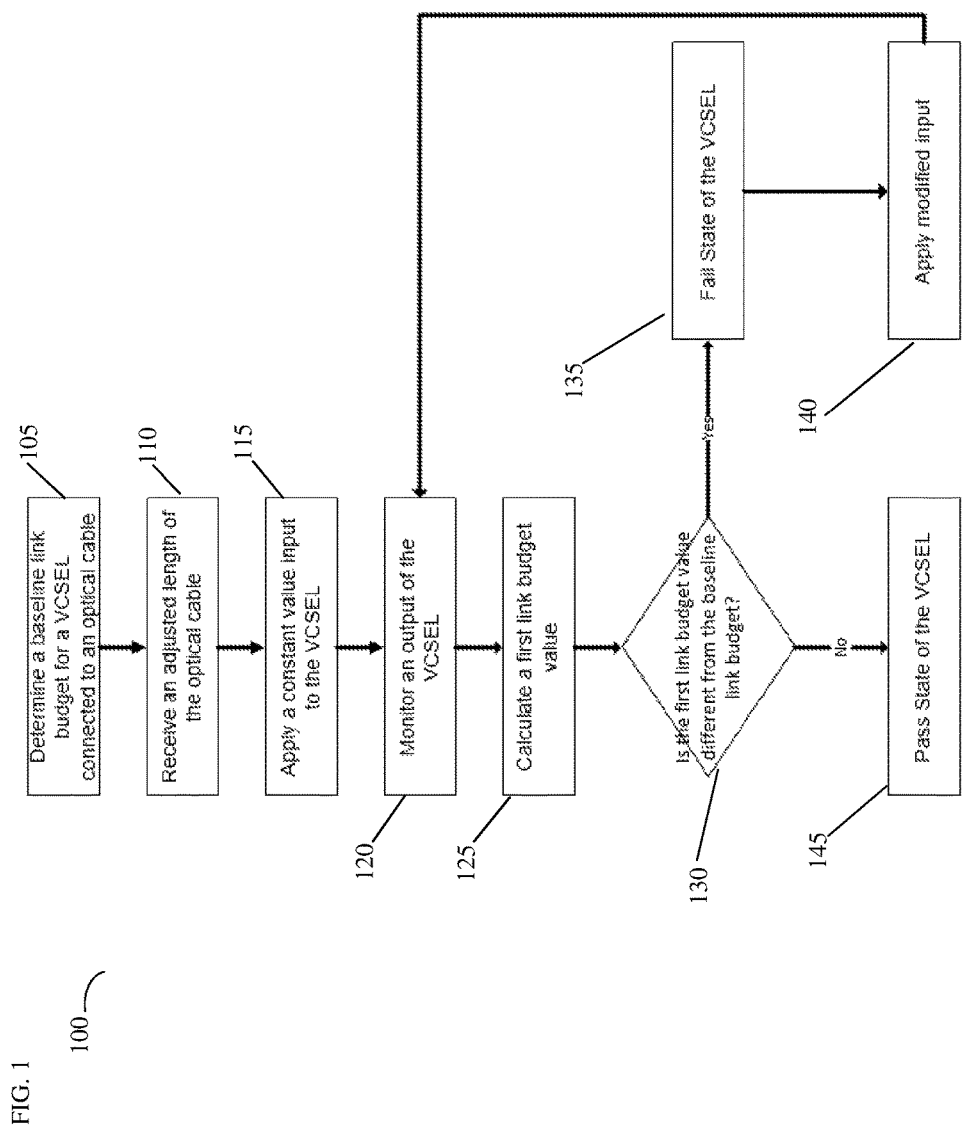
Figure 2:
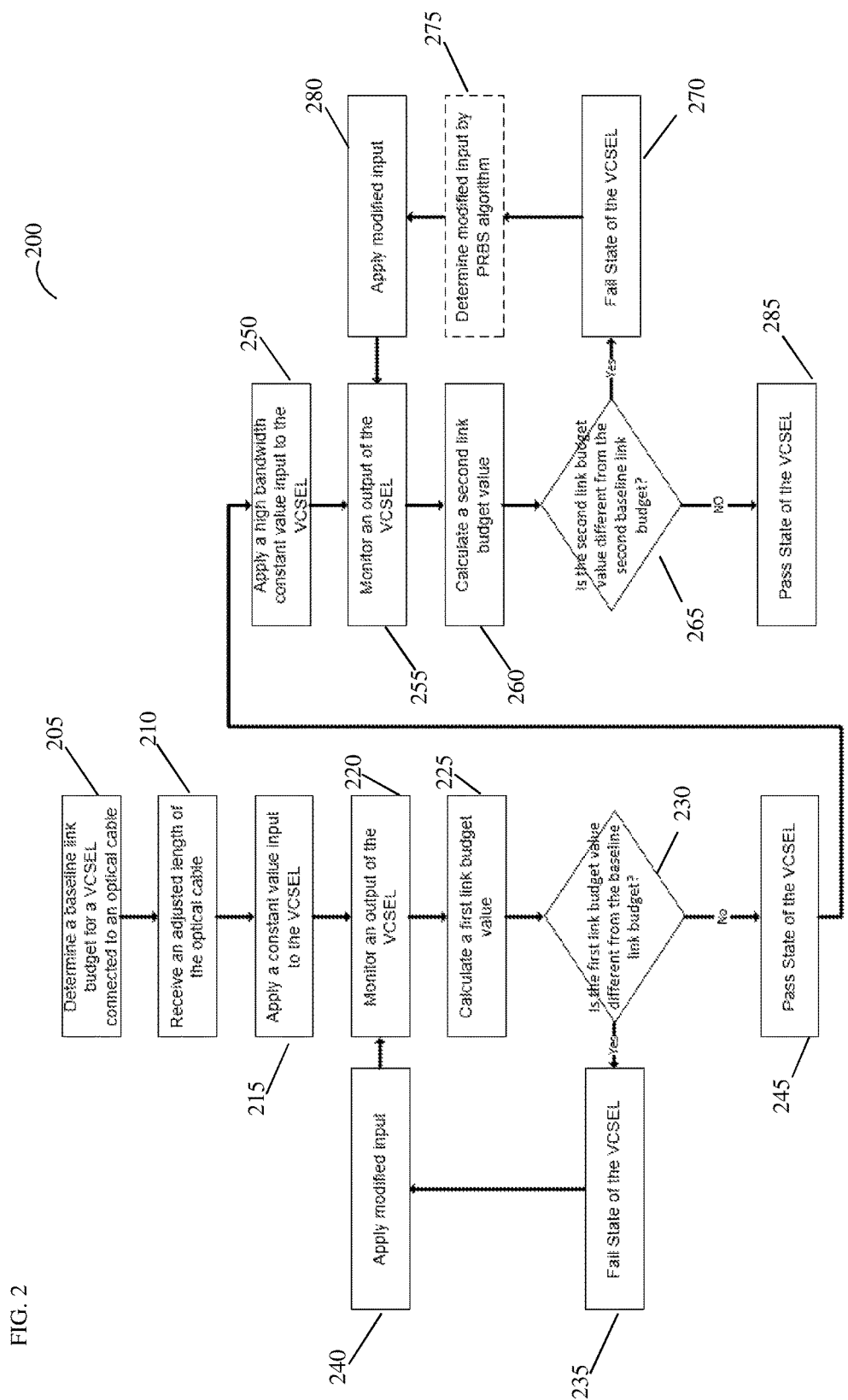
Figure 3:
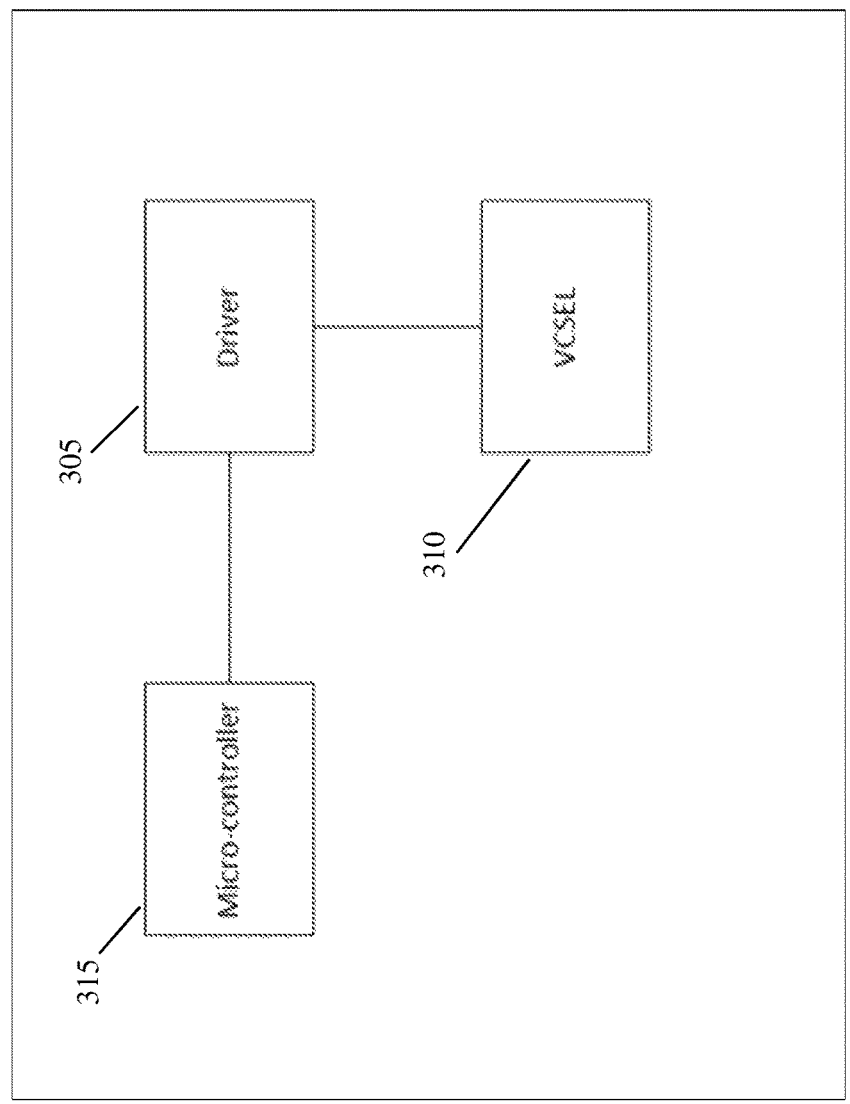

Having thus described the invention in general terms, reference will now be made to the accompanying drawings, which are not necessarily drawn to scale, and wherein:

FIG. 1 shows a block diagram illustrating an example optoelectronic system configuration, in accordance with some embodiments discussed herein;

FIG. 2 shows a block diagram illustrating an example optoelectronic system configuration, in accordance with some embodiments discussed herein; and FIG. 3 shows a block diagram schematically illustrating an optical transceiver system, in accordance with some embodiments discussed herein.

DETAILED DESCRIPTION

Optical cables are comprised of optical fibers. Optical cables may be utilized in conjunction with optical transmitters and receivers built into transceiver modules and systems located at the ends of the optical cables, such as AOCs, for transmitting and receiving the optical communication signals carried by the fibers. In some cases, the transceiver modules may include small form-factor pluggable (SFP) transceivers or dual SFP transceivers. The transceiver modules or systems may plug into suitable electrical communication ports, such as Gigabit Ethernet or InfiniBand® ports, of switching and computing equipment. Optoelectronic components in the transceiver modules and systems may convert the high-speed electrical signals output by the ports into optical signals for transmission over the fibers. In addition, the optoelectronic components may convert the optical signals received over the fibers into high-speed electrical signals for input to the electrical communication ports.

In many transceiver modules and systems, laser diodes, such as VCSELs, are used to generate optical signals for transmission over optical fibers. VCSELs in particular are favored for their high bandwidth and efficiency. In some implementations, an array of such VCSELs is used to drive a corresponding array of optical fibers, which are joined together in a ribbon configuration. Optical fibers may be connected to both VCSELs and photodiode configurations at opposite ends of the fibers such that one or more photodiodes may receive the light from the VCSELs at a receiving end of the fibers and convert the incident light into electrical signals. One or more sources may provide the electrical signals for transmission from a transmitting device or may receive the electrical signals after receipt from the transmitting device, and the sources may provide the electrical signals to the VCSELs for transmission as optical signals via optical fibers or may receive the electrical signals from the photodiodes via optical fibers.

In manufacturing optical cables, specifically AOCs, the length of the cable is set by a manufacturer's specifications with commercially available cables for use in data centers having lengths of any size, specifically ranging from less than a meter to as large as 100 meters. For example, AOCs may come in lengths of 2.0 meters and 2.5 meters. As is evident with this example, manufacturers conventionally create AOCs which have standard lengths, such as in fixed-length increments (e.g., 0.5-meter increments), and are not available in lengths optimized for a specific rack in a data center. Therefore, installing components in a data center rack often results in large amounts of unnecessary optical cable positioned in small spaces, such as when the optimal cable length is between two increments of manufactured cable length and the user is forced to select the next biggest cable length to make the connection. Space in a data center, specifically intra-rack free space, is critical to efficient operation of a data center. When the intra-rack space in reduced due to unnecessary optical cables, the rack components may become overheated and/or operate inefficiently. Further, AOCs comprised of glass fibers cannot be cut by the user on-site in order to create a user-defined cable length. The cutting of the glass fibers results in irreparable damage to the cable's optical path, rendering the AOC inoperable for data center use.

With the utilization of plastic optical fibers (POFs) in many optoelectronic systems, modifications to conventional wiring methods have emerged. Employing plastic fibers instead of glass fibers proves advantageous as POFs may be cut to custom, user-defined lengths to help maintain an optimal optical path capable of use in a data center rack. However, VCSELs and associated photodiodes positioned at the ends of AOCs are typically optimally configured for use with an AOC of a predetermined length set by the manufacturer.

A link budget value of an optoelectronic system accounts for the gains and losses from the transmitter (e.g., VCSEL) through the optical media (e.g., optical fibers) to the receiver (e.g., the photodiode). When an AOC is manufactured, a link budget value, and other associated operating parameters, is inherent in the length of the AOC and is reported by the manufacturer to the user as a specification of the cable. However, when the length of an AOC is altered, the actual link budget value associated with the cut AOC is no longer equivalent to the link budget value corresponding to the manufacturer's specific length.

Accordingly, embodiments of the present invention that are described hereinbelow provide a method for configuring an optoelectronic system such that AOCs of different user-defined lengths may be utilized without replacing the associated VCSEL or degrading the output of the system. In addition, embodiments of the present invention also provide for iterative adjustment of the VCSEL inputs in order to ensure that the link budget value of the AOC of a user-defined length is substantially equivalent to the link budget value assigned by the manufacturer.

For the sake of clarity and convenience of description, the embodiments that are described below refer to a particular optical cable configuration, using VCSELs as emitters and certain types of switching elements. The principles of the present invention, however, may similarly be implemented using other types of emitters (e.g., other types of lasers), modulators, and switching elements, as well as other optoelectronic transceiver components (e.g., photodiodes and differently configured optical cables and connector modules).

Length Modified AOCs

With reference to FIG. 1, a block diagram is provided that illustrates an optoelectronic configuration method 100 for use with some embodiments described herein. The method may include the steps of determining a baseline link budget value for a VCSEL connected to an AOC at Block 105 and may receive an adjusted length of the AOC at Block 110. The method may also include applying a constant value input (e.g., a constant voltage or constant current value) to the VCSEL at Block 115 and may monitor an output of the VCSEL (e.g., a voltage or current value) at Block 120. The method may calculate first link budget value at Block 125 based upon the input and output of the VCSEL at Blocks 115, 120 and may compare the first link budget value with the baseline link budget value at Block 130. Based upon the results of the comparison at Block 130, the method may determine a fail state of the VCSEL at Block 135 or a pass state of the VCSEL at Block 145. If the method determines a fail state at Block 135, the method may apply a modified input value at Block 140, and repeat the method 100 until a pass state of the VCSEL is achieved.

With continued reference to FIG. 1, the optoelectronic configuration method 100 may determine a baseline link budget value (e.g., an actual length) for a VCSEL connected to an AOC at Block 105. In some embodiments, the baseline link budget value may be known to the VCSEL through specification by the manufacturer, or may be manually inputted by the user to the VCSEL prior to installing the AOC in a data center rack. Embodiments of the optoelectronic configuration method 100 may accommodate adjustments in the length of the AOC at Block 110 such that length of the AOC is compatible with its intended use (e.g., an effective length). The length adjustment of the AOC may be accomplished by any means (e.g., splicing, cutting, etc.) so long as the optical path of the AOC is maintained.

Once the length of the AOC has been adjusted (e.g., on site by the user) for its intended application, the associated link budget value for the AOC may no longer be equivalent to the baseline link budget value. The method may then apply a constant value input to the VCSEL (e.g., a constant voltage or a constant current) at Block 115 and may monitor an output of the VCSEL (e.g., a resulting voltage or current) at Block 120. If a constant current value is inputted to the VCSEL, the optoelectronic configuration method 100 may monitor an outputted voltage. Similarly, if a constant voltage value is inputted to the VCSEL, the optoelectronic configuration method 100 may monitor an outputted current.

Upon monitoring output values at Block 120, the optoelectronic configuration method 100 may calculate a first link budget value based on the constant value input and output of the VCSEL at Block 125. As would be understood by one or ordinary skill in the art in light of this disclosure, a link budget value may be calculated by summing the transmitted power of the VCSEL and the gains experienced by the VCSEL and subtracting the losses experienced by the VCSEL. An optical signal transmitted by the VCSEL through an optical fiber and received by a photodiode may be monitored in order to determine the transmitted power and losses experience by the VCSEL. In some embodiments, this calculation may also be accomplished with the assistance of a current-to-voltage converter (e.g., a transimpedance amplifier "TIA").

Upon calculation of the first link budget value at Block 125, embodiments of the optoelectronic configuration method 100 may compare the first link budget value with the baseline link budget value at block 130. The method may determine that the first link budget value and the baseline link budget value are not substantially equivalent and, as a result, may determine a fail state of the VCSEL at Block 135. Conversely, the method may determine that the first link budget value and the baseline link budget value are substantially equivalent and, as a result, may determine a pass state of the VCSEL at Block 145. In some embodiments, the first link budget value and the baseline link budget value may be considered substantially equivalent if they are within 3 decibels (db) of each other.

If the optoelectronic configuration method 100 determines a fail state of the VCSEL at Block 135, the method may iteratively apply a modified input to the VCSEL and iteratively monitor the output of the VCSEL until a pass state is obtained at Block 145. In some embodiments, the modified input may be determined and inputted by a user. In other embodiments, the VCSEL may determine a modified input value through known relationships such as input impedance, the relationship $V=IZ$, where V is voltage, I is current, and Z is impedance, at high bandwidth. These characteristic are known by the VCSEL and may be adjusted accordingly (such as by a VCSEL driver or microcontroller) to achieve the necessary link budget value. For example, the method may determine a first link budget value that is larger than the baseline link budget value and may decrease a constant voltage to the VCSEL in order to achieve a first link budget value that is substantially equivalent to the baseline link budget value. Although the optoelectronic configuration method 100 is described as comparing the first link budget value and the baseline link budget value to determine if they are substantially equivalent, the present disclosure contemplates that these link budget values may be required to have any relationship such that the AOC functions as intended. For example, in some embodiments, the method may require that the baseline link budget value and the first link budget value are within 3 db of one another.

The present disclosure contemplates that the optoelectronic method 100 may require multiple iterations in order for the desired relationship between the baseline link budget value and the first link budget value to be obtained (e.g., to determine a pass state of the VCSEL). In such an embodiment, the method may determine multiple fail states of the VCSEL at Block 135 and may iteratively apply multiple modified inputs at Block 140 until a pass state is determined at Block 145. Further, in some embodiments, the optoelectronic method 100 may be indicative of a low bandwidth test to ensure the VCSEL operates at the desired link budget value following adjustment to the length of the AOC. Such an embodiment may not reflect normal operating conditions of the optoelectronic system (e.g., a lower voltage or current value may be inputted to the VCSEL as a minimum threshold requirement for operation).

The present disclosure contemplates that it may be advantageous to the user for the VCSEL to additionally be subjected to higher bandwidth operating conditions (e.g., higher voltage or current inputs) in order to more accurately simulate the VCSEL under normal operating conditions. With reference to FIG. 2, for example, a block diagram is provided that illustrates an optoelectronic configuration method 200 for use with some embodiments described herein. The method may include similar steps to optoelectronic method 100 including: determining a baseline link budget value for a VCSEL connected to an AOC at Block 205, receiving an adjusted length of the AOC at Block 210, applying a constant value input (e.g., a constant voltage or constant current value) to the VCSEL at Block 215, monitoring an output of the VCSEL (e.g., a voltage or current value) at Block 220, calculating a link budget value at Block 225 based upon the input and output of the VCSEL at Blocks 215, 220, comparing the link budget value with the baseline link budget value at Block 230, determining a fail state of the VCSEL at Block 235 or a pass state of the VCSEL at Block 245, and, if the method determines a fail state at Block 235, applying a modified input value at Block 240 and repeating the method 200 until a pass state of the VCSEL is achieved at block 245.

In addition to these steps, the optoelectronic configuration method 200, upon determining a first pass state of the VCSEL at Block 245, may apply a high bandwidth constant value input (e.g., constant current or constant voltage) to the VCSEL at Block 250. Similar to the first iterative process found Blocks 215-245, the optoelectronic configuration method 200 may monitor an output of the VCSEL at Block 255, may calculate a second link budget value at Block 260, may compare the second link budget value to a second baseline link budget value at Block 265 and determine if the link budget values are substantially equivalent. Based upon the results of the comparison at Block 265, the method may determine a fail state of the VCSEL at Block 270 or a pass state of the VCSEL at Block 285. If the method determines a fail state at Block 270, the method may apply a modified input value at Block 280 and may repeat the method 200 using iteratively modified input values until a pass state of the VCSEL is achieved.

As described above in reference to FIG. 1, the optoelectronic configuration method 200 may require multiple iterations in order for the desired relationship to be obtained between the first baseline link budget value and the first link budget value, and between the second baseline link budget value and the second link budget value. In such an embodiment, the method may determine multiple fail states of the VCSEL at Block 270 and may iteratively apply multiple modified inputs at Block 280 until a pass state is determined at Block 285. In some embodiments, as described above, the optoelectronic method 200 may be indicative of a high bandwidth test to ensure the VCSEL operates at the desired link budget value following adjustment to the length of the AOC. Such an embodiment may reflect normal operating conditions of the optoelectronic system (e.g., a higher voltage or current value is inputted to the VCSEL as a normal operating threshold requirement). In some cases, the method 100 shown in FIG. 1 may be implemented until a pass state of the VCSEL is achieved, and then the method 200 shown in FIG. 2 may be implemented until a pass state of the VCSEL is again achieved. Thus, the VCSEL may achieve a pass state under the method 100 of FIG. 1 (low frequency), but may additionally require one or more iterations of the method 200 of FIG. 2 (high bandwidth) before the VCSEL achieves a final pass state.

In some embodiments, the optoelectronic configuration method 200 may determine the second modified input value at Block 275 through the use of a pseudorandom binary sequence (PRBS) algorithm. Specifically, the method may employ a PRBS-7 algorithm, as would be understood of one of ordinary skill in the art in light of the present disclosure, for calculating the appropriate modified input value at Block 280 such that the VCSEL will operate as desired with the AOC of adjusted length.

The present disclosure contemplates that the optoelectronic configuration methods 100, 200 may be implemented in an optical transceiver system (e.g., the optical transceiver system 300 in FIG. 2) via a driver and/or micro-controller (e.g., the driver 305 and the microcontroller 315 in FIG. 2) during operation (e.g., after the optical transceiver system 300 has been installed in an optical communication system in a datacenter and is in operation). In such an embodiment, the driver and/or micro-controller may continuously or continually monitor the output of the VCSEL during operation and may continuously/continually compare a calculated link budget value with a baseline link budget value, according to embodiments of the method 100, 200 described above.

With reference to FIG. 3, for example, a block diagram is provided that shows schematically an optical transceiver system 300 capable of employing embodiments of the optoelectronic configuration methods 100, 200 shown in FIGS. 1 and 2. An optical transceiver system 300 may include a driver 305, a VCSEL 310, and/or a micro-controller 315. In some cases, the method 300 may be implemented via firmware installed in the driver 305 and/or the micro-controller 315. For example, the driver 305 and/or the micro-controller 315 may include non-transitory computer-readable medium having computer instructions stored thereon. The driver 305 may be configured to provide an electrical input (e.g., a current) to the VCSEL 310 to produce an optical signal output from the VCSEL at a desired wavelength. The driver 305 may be embodied as hardware, software, and/or firmware, which may, in some cases, include the functionality of the micro-controller 315. In other cases, however, a separate micro-controller 315 may be provided that is in communication with the driver 305 and directs the operation of the driver, as shown in FIG. 3.

In some cases, the micro-controller 315 may be configured to direct the driver 305 to apply an input to the VCSEL 310, such that the output of the VCSEL 210 may be measured at the driver 305 by the micro-controller 315. The micro-controller 315 may be configured to ensure that the input values (e.g., the constant current or voltage values) remain constant for the duration of the applicable steps of the method.

Accordingly, as described above, FIGS. 1 and 2 illustrate flowcharts of systems, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions, as described above. For example, one or more of the procedures described above may be embodied by computer program instructions. In this regard, the computer program instructions which embody the procedures described above may be stored by a memory employing an example embodiment of the present invention and executed by a processor (e.g., the micro-controller or driver with controller circuitry, or a computer implementing testing prior to installation of the VCSEL or other component in an optical communication system). As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions which execute on the computer or other programmable apparatus provide operations for implementing the functions specified in the flowchart block(s).

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the optoelectronic coupler and transceiver modules. In addition, the methods described above may include fewer steps in some cases, while in other cases may include additional steps. Modifications to the steps of the testing and monitoring methods described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for configuring an optoelectronic system including a vertical cavity surface emitting laser (VCSEL) for emitting light to accommodate an optical cable having a user-configured length, comprising:
   determining a first baseline link budget value reflective of operation of a VCSEL with an optical cable having a pre-defined length;
   applying a first constant value input to the VCSEL, wherein the VCSEL is coupled to an optical cable having a user configured length, wherein the user configured length is different from the pre-defined length;
   monitoring a first output of the VCSEL;
   calculating a first link budget value based on the first output and the first constant value input of the VCSEL;
   determining a first pass state or a first fail state of the VCSEL based on a comparison of the first link budget value to the first baseline link budget value; and, if a fail state is determined,
   iteratively applying a first modified constant value input to the VCSEL, calculating a first modified link budget value, and comparing the first modified link budget value to the first baseline link budget value to determine a first pass state or a first fail state of the VCSEL.

2. The method of claim 1, wherein the first constant value input is a voltage and the first output is a current.

3. The method of claim 1, wherein the first constant value input is a current value and the first output is a voltage.

4. The method of claim 1, further comprising:
   determining a second baseline link budget value reflective of operation of a VCSEL with an optical cable having a pre-defined length;
   applying a second constant value input to the VCSEL;
   monitoring a second output of the VCSEL;
   calculating a second link budget value based on the second output and the second constant value input of the VCSEL;
   determining a second pass state or a second fail state of the VCSEL based on a comparison of the second link budget value to the second baseline link budget value; and, if a fail state is determined,
   iteratively applying a second modified constant value input to the VCSEL, calculating a second modified link budget value, and comparing the second modified link budget value to the second baseline link budget value to determine a second pass state or a second fail state of the VCSEL.

5. The method of claim 4, wherein the second constant value input is larger than the first constant value input and, wherein the second constant value input is indicative of a high bandwidth environment.

6. The method of claim 4, wherein the second constant value input is a voltage and the second output is a current.

7. The method of claim 4, wherein the second constant value input is a current and the second output is a voltage.

8. The method of claim 4, further comprising varying a pre-emphasis value input to the VCSEL, wherein varying the pre-emphasis value input modifies the second link budget value.

9. The method of claim 4, wherein the second modified constant value input is determined via a pseudorandom binary sequence (PRBS) algorithm.

10. The method of claim 4, wherein the optical cable is a plastic optical fiber (POF).

11. A non-transitory computer-readable medium having computer instructions stored thereon, the computer program instructions being configured to:
    receive a first baseline link budget value reflective of operation of a VCSEL with an optical cable having a pre-defined length;
    apply a first constant value input to the VCSEL, wherein the VCSEL is coupled to an optical cable having a user configured length, wherein the user configured length is different from the pre-defined length;
    monitor a first output of the VCSEL;
    calculate a first link budget value based on the first output and the first constant value input of the VCSEL;
    determine a first pass state or a first fail state of the VCSEL based on a comparison of the first link budget value to the first baseline link budget value; and, if a fail state is determined,
    iteratively apply a first modified constant value input to the VCSEL, calculate a first modified link budget value, and compare the first modified link budget value to the first baseline link budget value to determine a first pass state or a first fail state of the VCSEL.

12. The computer-readable medium of claim 11, wherein the first constant value input is a voltage and the first output is a current.

13. The computer-readable medium of claim 11, wherein the first constant value input is a current value and the first output is a voltage.

14. The computer readable medium of claim 11, further configured to:
- receive a second baseline link budget value reflective of operation of a VCSEL with an optical cable having a pre-defined length;
- apply a second constant value input to the VCSEL;
- monitor a second output of the VCSEL;
- calculate a second link budget value based on the second output and the second constant value input of the VCSEL;
- determine a second pass state or a second fail state of the VCSEL based on a comparison of the second link budget value to the second baseline link budget value; and, if a fail state is determined,
- iteratively apply a second modified constant value input to the VCSEL, calculate a second modified link budget value, and compare the second modified link budget value to the second baseline link budget value to determine a second pass state or a second fail state of the VCSEL.

15. The computer readable medium of claim 14, wherein the second constant value input is larger than the first constant value input and, wherein the second constant value input is indicative of a high bandwidth environment.

16. The computer readable medium of claim 14, wherein the second constant value input is a voltage and the second output is a current.

17. The computer readable medium of claim 14, wherein the second constant value input is a current and the second output is a voltage.

18. The computer readable medium of claim 14, further configured to vary a pre-emphasis value input to the VCSEL, wherein varying the pre-emphasis value input modifies the second link budget value.

19. The computer readable medium of claim 14, wherein the second modified constant value input is determined via a pseudorandom binary sequence (PRBS) algorithm.

20. The computer readable medium of claim 14, wherein the optical cable is a plastic optical fiber (POF).

\* \* \* \* \*